United States Patent [19]

Ujiie

[11] Patent Number: 5,121,159
[45] Date of Patent: Jun. 9, 1992

[54] PHOTOGRAPHIC PRINTER

[75] Inventor: Yoichi Ujiie, Kanagawa, Japan

[73] Assignee: Fuji Photo Film Co., Ltd., Kanagawa, Japan

[21] Appl. No.: 670,101

[22] Filed: Mar. 15, 1991

[30] Foreign Application Priority Data

Mar. 15, 1990 [JP] Japan .................................. 2-65291

[51] Int. Cl.⁵ ............................................. G03B 27/80
[52] U.S. Cl. .......................................... 355/38; 355/77
[58] Field of Search ....................... 355/38, 67, 68, 69;
356/224, 225; 354/20, 430, 481, 482; 250/214 G, 237 R

[56] References Cited

U.S. PATENT DOCUMENTS 3,000,281 9/1961 Rentschler ............................ 354/447
4,935,772 6/1990 Wakui et al. ........................... 355/68

FOREIGN PATENT DOCUMENTS 62-279238 11/1988 Japan .

Primary Examiner—L. T. Hix
Assistant Examiner—D. Rutledge
Attorney, Agent, or Firm—Sughrue, Mion, Zinn, Macpeak & Seas

[57] ABSTRACT

A photographic printer has a light source for illuminating negative film. A filter turret is disposed rotatably across an optical path from the light source, and is rotated by a stepping motor. A scanner is provided for measuring light. The turret is stopped in a predetermined position other than a position which keeps the photometric opening in the turret fully open, in order to reduce a light amount passed through from the light source. Data for the predetermined stop position is stored in a memory. A controller controls rotation of the stepping motor by reading out the stop position in order to detect a position taken by a picture frame on negative film. The memory also stores three other predetermined stop positions to stop respective color filters in offset positions in order to reduce a light amount at the time of three color separation photometry. With the invention, a conventionally used ND filter can be omitted while detecting the picture frame and three color separation photometry. Another stop position allows reduction of a light amount when photometry is effected for conditioning the light source. A normal control negative film can be omitted while conditioning the light source so as to prevent operational error.

16 Claims, 5 Drawing Sheets

PHOTOGRAPHIC PRINTER

BACKGROUND OF THE INVENTION

The present invention relates to a photographic printer, and more particularly to a printer for providing appropriate control of a light source for illuminating photographic film.

A photographic printer is provided with a printing light source such as a halogen lamp, which illuminates negative film to print picture frames on color paper. The halogen lamp in the printer changes with time, and accordingly is conditioned to compensate for gradual change. In a printer for use in a mini laboratory (printer-processor), a scanner is incorporated for automatically discriminating a type of scene recorded on a picture frame in order to prevent a subject failure. A color image area sensor or a monochrome image area sensor is used for the scanner, which subjects each point of the picture frame to three color separation photometry, calculates various characteristic values, and discriminates a scene to be printed so as to obtain such correction values for calculating an optimum exposure amount as a color correction coefficient. This scanner is used not only for photometry to obtain the exposure amount, but also for detecting a position taken by the picture frame from the surface of the negative film in order to position each picture frame in the exposure station.

To condition the light source, the power is adjusted to correct the gradually changed light source. Specifically, normal control negative film (Bull's eye) formed primarily of a widespread type of negative film, such as FUJI HR 100 (merchandise name) is positioned on a film carrier, and is subjected to photometry to obtain a density (a large area transmittance value or a transmittance value of a particular partial area), which is compared with that of the same normal control negative film measured before the change of the light source. The difference in density is used to correct the light source. However, there is a problem of complexity in the light source conditioning, because the normal control negative film fades with time, and must be conditioned. There is also a problem in that an operator incorrectly may use over-exposed control negative film and under-exposed control negative film for the light source conditioning, which are prepared for determining various other conditions.

In a photographic printer which employs additive color successive exposure, three additive primary color filters are used as exposure filters. A monochrome image area sensor is used as the scanner in combination with the color filters. Because the light amount is excessive for the image area sensor when it is used as the scanner, especially with respect to blue light, the amount of the blue light is reduced by an ND filter. However, this construction causes a problem in that parts and operations necessary to assemble the parts are increased, because an ND filter must be set in front of a blue filter on the filter turret or on the light receiving plane of the sensor.

To detect a picture frame on the film with the scanner, the white light illuminating the negative film without restricting the light amount causes such saturation of the image area sensor as to make photometry impossible, because the light amount is excessive. Thus, an ND filter is provided to restrict a light amount incident on the image area sensor in the picture frame detecting procedure. There is a similar problem in the greater number of parts and operations.

Therefore, it is an object of the present invention to provide a photographic printer that is easily capable of performing photometry to detect a position of a picture frame and calculating an exposure amount, even without an ND filter.

It is another object of the present invention to provide a photographic printer capable of conditioning the light source reliably without operational error.

SUMMARY OF THE INVENTION

In order to achieve the above and other objects and advantages of this invention, a photographic printer is constituted by: a light source for illuminating an exposure station in order to make a photoprint on color paper from a picture frame of photographic film positioned in the exposure station; a filter turret rotatably disposed across an optical path between the light source and the exposure station, in which three color filters of three primary colors and an opening for photometry are formed; drive circuitry for rotating the turret so as to position one of the photometric opening and the three color filters in the optical path; a photometric sensor for measuring light passed through the exposure station from the light source when the photometric opening is positioned in the optical path; a memory for storing at least one predetermined stop position such that the turret is stopped in a position offset from a position where an area formed by the photometric opening in the optical path has a maximum size, in order to reduce a light amount of the light source; and control circuitry for controlling rotation of the drive means by reading out the stop position from the memory.

The memory stores three other predetermined stop positions such that the turret is stopped in positions offset from respective positions where areas formed by the respective color filters in the optical path have a maximum size, in order to reduce a light amount of the light source when the respective color filters are positioned in the optical path for photometry in order to calculate an exposure amount for each color.

According to a preferred embodiment, the stop position is a position which reduces an amount of light from the light source when photometry is effected for conditioning the light source which changes with time. The memory stores a predetermined reference light amount of the light source. The control circuit controls the light source at the time of conditioning the light source to make a light amount measured in the photometric sensor coincident with the reference light amount read out of the memory means. A light amount of the light source at the time of conditioning the light source at the stop position is reduced to a light amount under a condition with a normal control negative film inserted in the optical path for conditioning the light source.

In the present invention, an ND filter, otherwise conventionally needed, can be omitted at the time of photometry for detecting the picture frame and calculating an exposure amount, so as to reduce the number of parts in the photographic printer. The light amount can be reduced merely by finely changing the stop position of the filter turret, without adding an extra device for reducing the light amount to a conventional printer, thereby making it easy to convert a mechanism in the conventional printer. The degree of reduction is variable, unlike the situation with an ND filter, so that a photometric light amount can be determined finely to be optimum to the scanner, so that measurement becomes more precise. A normal control negative film conventionally inserted in the optical axis can be omitted at the time of conditioning the light source so as to prevent erroneous insertion of a different negative film. It is unnecessary to consider a fading developed with time in a normal control negative film, thus simplifying the light source conditioning operation.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT

Figure 1:
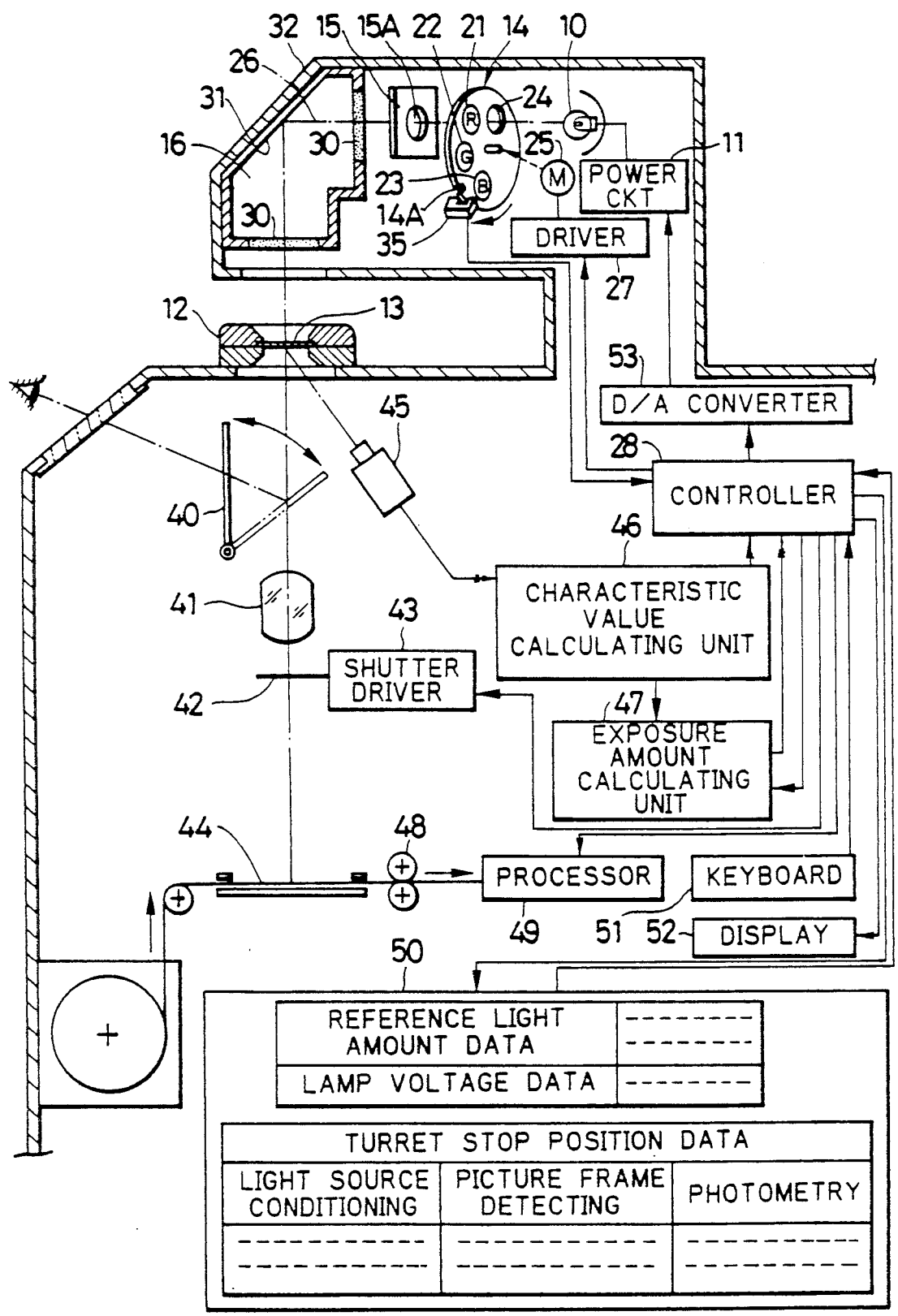
FIG. 1 is a schematic diagram of a photographic printer in accordance with the present invention.

Referring to FIG. 1, which shows the inventive photographic printer, a halogen lamp 10 used as a printing lamp is powered by a power circuit 11 which controls the amount of light emitted. Light emitted from the lamp 10 is applied to negative film 13, which is held in position with a film carrier 12. A filter turret 14, a masking plate 15, and a mixing box 16 are disposed along an optical path 26 between the lamp 10 and the film carrier 12.

The filter turret 14 consists of a disc with a red filter 21, a green filter 22, a blue filter 23, and a measurement opening 24 disposed thereon along a periphery of a circle concentric with the disc. A stepping motor 25 rotates the filter turret 14. The measurement opening 24 is used not only for photometry, but also for visually inspection of the negative film 13 by allowing illumination of the negative film 13. The stepping motor 25, which inserts the color filters 21 to 23 and the measurement opening 24 selectively in the optical path 26, is controlled by a controller 28 through a driver 27. The mixing box 16, provided with a diffusion plate 30 and a reflection mirror 31, diffuses the light from the lamp 10 sufficiently, and changes the direction of the optical path 26 through 90° in the vertical direction.

The masking plate 15, which has an aperture 15A formed thereon having the same diameter as the color filters 21 to 23 and the measurement opening 24 of the filter turret 14, is fixed on a printer body 32 such that the optical path 26 passes through the center of the aperture 15A. A light passing area 34 (FIG. 2) is the inside formed by both areas of the aperture 15A and any of the color filters 21 to 23 and the measurement opening 24. A change in the stopped position of the filter turret 14 can reduce the light passing area 34. As a result, the amount of the light passing through the masking plate 15 is restricted or reduced according to the amount of reduction.

Figure 2:
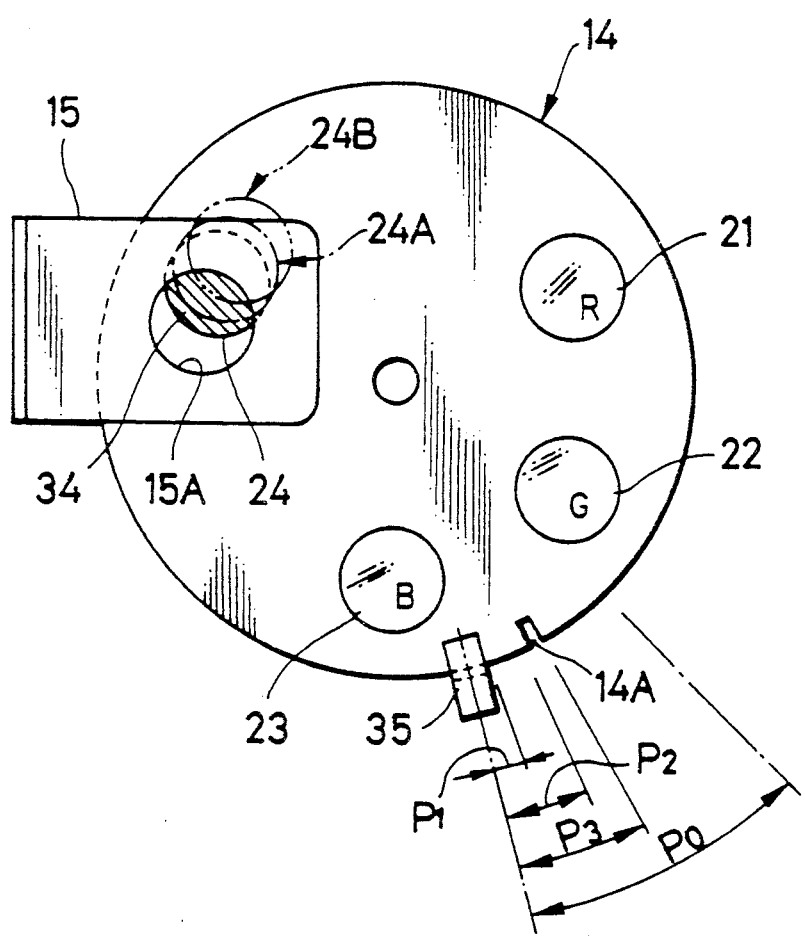
FIG. 2 is a front view of a filter turret in the printer shown in FIG. 1 and a light passing area formed by the filter turret and a masking plate.

As shown in FIG. 2, a recess 14A, formed on the disc of the filter turret 14 for detecting the stopped position of the filter turret 14, is detected by a photoelectric sensor 35. A recess detecting signal developed by the photoelectric sensor 35 is forwarded to the controller 28.

The film carrier 12 is disposed beneath the mixing box 16. As is well-known in the art, the film carrier 12 automatically positions the picture frame to be printed on the exposure station in accordance with a detecting signal of each picture frame on the negative film 13. A movable mirror 40, a printing lens 41, and a shutter 42 are disposed under the film carrier 12. A picture frame on the negative film 13 is projected onto color paper 44 through the printing lens 41, while a shutter driver 43 opens the shutter 42. The color paper 44 is fed by use of a pair of feeding rollers frame by frame, exposed, and developed in a processor 49 in a well-known manner.

A scanner 45 is disposed in a position obliquely downward from the film carrier 12, and preferably is a monochrome image area sensor. The scanner 45 serves not only to detect the picture frames, but also to convert three color light photoelectrically at each point of picture frames so as to output color-separated electric signals in time sequence to a characteristic value calculating unit 46. In the characteristic value calculating unit 46, time sequential color signals are subjected to logarithmic conversion, A/D conversion, and calculation of characteristic values such as LATD (large area transmittance density) of each picture frame and color correction coefficients, which are forwarded to an exposure amount calculating unit 47. The exposure amount calculating unit 47 calculates exposure amount for each color in accordance with a well-known exposure amount equation from characteristic values and exposure correction data as required entered by an operator. In a light source conditioning mode to be described later, the LATD calculated in the characteristic value calculating unit 46 is forwarded to controller 28.

The controller 28 fetches the exposure amount of each color calculated in this manner. Insertion time of the color filters 21 to 23 into the optical path 26 is obtained from each exposure amount in the controller 28, which opens the shutter 42, rotates the filter turret 14 up to the predetermined position, and inserts the color filters 21 to 23 successively into the optical path 26 to carry out a three color successive exposure.

The controller 28, constituted by a well-known microcomputer, is connected to a memory 50, a keyboard 51 and a display 52. The keyboard 51 is used for entering data and commands for operation. The display 52 indicates the content of the data and the kind of command thus entered. The memory 50 stores a program for sequentially controlling associated control circuits, reference light amount data, lamp voltage data, and turret stop position data for varying the light passing area 34 defined by the filter turret 14 and the masking plate 15.

The turret stop position data are precedently obtained for each of the light source conditioning process, the picture frame detecting process, and the photometry process. Specifically, for the light source conditioning process, a turret stop position is determined to reduce the light amount of the lamp to the same value as that of the light passed through the normal control negative film conventionally used. The number of drive pulses for stopping the stepping motor 25 in the determined turret stop position is written in a corresponding area in the memory 50 as stop position data. For example, the drive pulse number $P_1$ for conditioning the light source is "10" to be written in the memory 50, wherein a drive pulse number $P_0$ is "100" when the measurement opening 24 is kept fully open in the stop position where the aperture 15A of the masking plate 15 matches the measurement opening 24 (see FIG. 2).

For the picture frame detecting process, a turret stop position for reducing the light amount is obtained as a drive pulse number for each type of negative film, and is written a corresponding area in the memory 50. For example, the drive pulse number $P_2$ in the case of negative film FUJI HR 100 (merchandise name) is "35" pulses with reference to the timing of detecting the recess 14A. The drive pulse number $P_3$ in the case of negative film REALA (merchandise name) is "50" pulses. For the photometry process as well, a turret stop position is determined to reduce the light amount to the same value as that of the light passed through the ND filter conventionally used. The obtained drive pulse number is written in a corresponding area in the memory 50.

In FIG. 2, showing the position taken by the measurement opening 24 in the process of detecting the picture frame on REALA, the measurement opening 24 takes a position 24A indicated by the dot-dash-line in the process of detecting picture frame on HR 100, and a position 24B indicated by the two-dot-dash-line in the light source conditioning process.

The controller 28 controls the associated control circuits sequentially in accordance with the program stored in the memory 50. At the time of printing, the lamp voltage data read out of the memory 50 is sent to a D/A converter 53. The D/A converter 53 converts the lamp voltage data to an analog signal and enters it in the power circuit 11 to control the light amount of the lamp 10.

Figure 3:
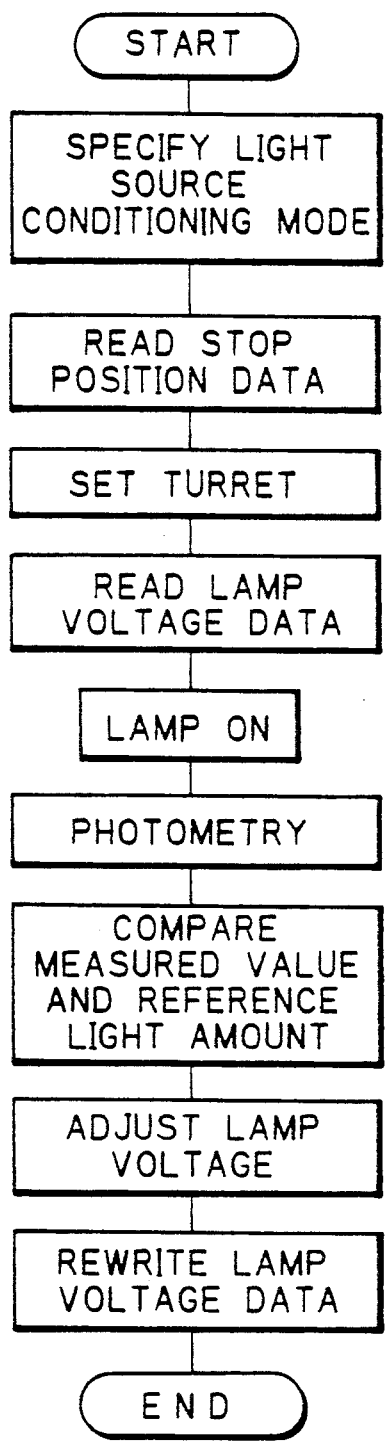
FIG. 3 is a flowchart of a light source conditioning process by use of the printer shown in FIG. 1.

The operation of the foregoing embodiment now will be described. At the time of conditioning the light source for starting the operation of the printer, a mode specifying key in the keyboard is operated to specify the light source conditioning mode. In this mode, the controller 28 operates all the associated control circuits by following the steps shown in FIG. 3. The drive pulse number $P_1$ first is read out of the light source conditioning memory area in the memory 50 for the turret stop position. The stepping motor 25 is controlled based on the $P_1$ pulses. Thus the filter turret 14 is stopped at the predetermined stop position to keep the light passing area 34 smaller than the position with the measurement opening fully open as shown in FIG. 2. Lamp voltage data then are read out of the lamp voltage data memory area in the memory 50.

The power source 11 is driven at the lamp voltage indicated by the lamp voltage data to actuate the lamp 10. Accordingly, the light amount is reduced to the same value as that of the light amount at the time when the conventional normal control negative film is set on a film carrier. Printing light is subjected to photometry under this condition. The measured photometric value is compared with the reference light amount stored in a reference light amount data memory area in the memory 50. If a difference obtained from this comparison is larger than a permissible maximum, the lamp voltage is either enlarged or reduced for adjustment according to the obtained difference at a predetermined number of steps.

After the change in the lamp voltage, similar photometry and comparison are repeated. Repetition of this operation adjusts the light amount of the lamp to be close to the reference light amount. A new lamp voltage attained at the time of completing the adjustment of the light amount is rewritten as a lamp voltage data in the memory 50. Thereafter, the lamp is driven at the renewed lamp voltage data until another conditioning of the light source.

Figure 4:
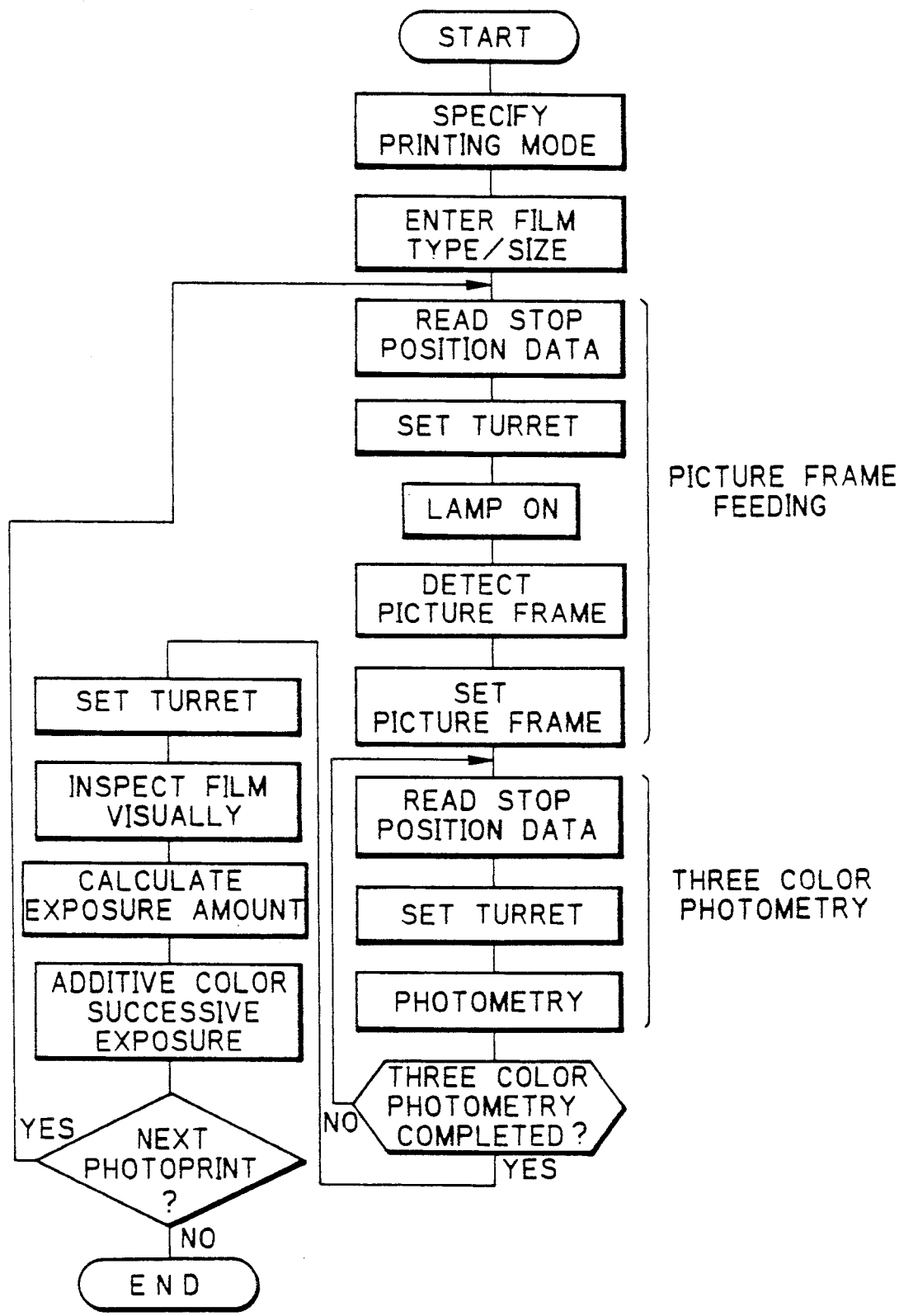
FIG. 4 is a flowchart of a printing process by use of the printer shown in FIG. 1.

Printing in exposure is ready after determining all the conditions needed for starting the initial operation including the light source conditioning. The printing mode is specified, in which the operation of the controller is shown in FIG. 4. A picture frame on the negative film 13 is detected by the scanner 45. Based on the obtained picture frame detection signal, the feeding rollers of the film carrier 12 are controlled to set the picture frame to be printed in the exposure station In the picture frame detecting process, a film type and a film size are entered in the controller 28 from the film positioned on the film carrier 12. The controller 28 refers to the memory 50 in the memory area for the stop position data for detecting the picture frame by use of address data of the film type/size signals, thereby to obtain the corresponding stop position data in the number of drive pulses The stepping motor 25 is driven according to these stop position data to stop the filter turret 14 in the predetermined stop position. The light amount of the lamp 10 thus is reduced, with the light passing area 34 being reduced according to an amount of deviation between the aperture 15A of the masking plate 15 and the measurement opening 24 of the filter turret 14. Because the reduction in the light amount is determined to be the same as that by use of an ND filter conventionally disposed in front of the image area sensor, the ND filter can be omitted The photometric values from the scanner 45 are entered in the controller 28 through the characteristic value calculating unit 46. The controller 28 detects the picture frame on the basis of the photometric values. As is well known in the art, this detection of the picture frame is effected by detection of its edges from the change in density between each picture frame and each unexposed area outside picture frames on the negative film 13. The feeding rollers on the film carrier 12 are rotated by a predetermined amount after frame detection so as to position the picture frame to be printed in the exposure station.

The picture frame to be printed next is subjected to three color separation photometry by means of the scanner 45. The filter turret 14 is rotated to insert the color filters 21 to 23 successively into the optical path 26. The light amount is reduced behind the masking plate 15 such that the image area sensor constituting the scanner 45 receives an optimum light amount. Specifically, the light passing area 34 is defined by the blue filter 23 and the aperture 15A of the masking plate 15 at the time of measuring the blue light, and reduces the light amount of the lamp 10. Therefore, it is possible to effect photometry at the optimum light amount even without the conventional ND filter, because impossibility of photometry in the image area sensor is prevented by avoiding saturation by excessive light.

After completing photometry, the measurement opening 24 is inserted in the optical path 26, while the movable mirror 40 is inserted therein to make it possible to observe a negative image of the picture frame. When it is judged from observing the negative image that the exposure amount must be corrected, then exposure correction data are entered by an operator through the keyboard 51. These exposure correction data are sent to exposure amount calculating unit 47 through the controller 28.

The photometric value measured in the scanner 45 is entered in the characteristic value calculating unit 46, in which characteristic values such as LATD and color correction coefficients are calculated. The exposure amount calculating unit 47 calculates an exposure amount for each color from the characteristic values and exposure correction data entered as needed in accordance with a well-known exposure amount calculating equation. The controller 28 calculates exposure time for each color from the obtained exposure amount. The shutter driver 43 is controlled according to the exposure time, at the same time as the filter turret 14 is rotated to effect successive three color exposure. Although the process of the three color successive exposure may be to operate the shutter 42 under the condition in which each color filter first is set in the optical path, yet it is preferable, as disclosed in Japanese Patent Laid-Open Publication No. 63-279238, that printing be performed even during the rotation of the filter turret 14 so as to shorten the printing time. According to this printing method, the shutter 42 is opened fully before each color filter is set in the optical path, and is kept open while the filter turret 14 rotates until matching each color filter to the position of the aperture 15A.

Printing also may be effected firstly by white light through the measurement opening 24 and secondly by the light of each color, so as to shorten the total time for printing. Instead of controlling exposure by changing the exposure time, exposure control may be effected by the masking plate 15 and the filter turret 14 for reducing the light amount, while the exposure time with each color is kept constant.

Figure 5:
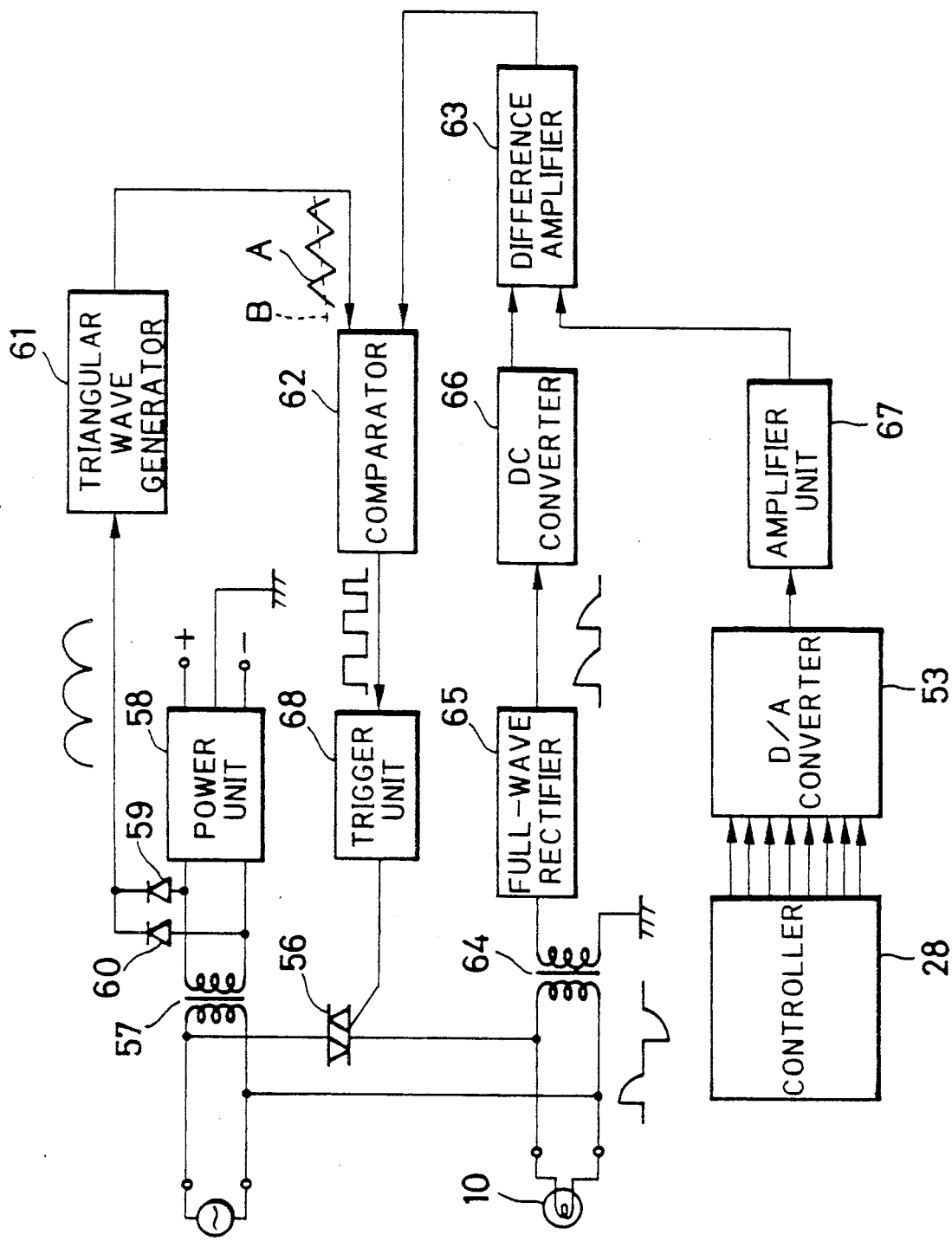
FIG. 5 is a block diagram of another exemplary embodiment of a power source incorporated in the printer according to the present invention.

FIG. 5 is a block diagram showing an example of a power circuit with feedback control. In this embodiment, the electric power of the lamp 10 is controlled by flashing the lamp 10 intermittently and by controlling the flashing time of the lamp 10. The lamp 10 is connected via a triac 56 to an AC power supply (100 V in this embodiment). The power supplied to the lamp 10 is regulated by turning on the triac 56 for a duration corresponding to the reference light amount at timings synchronous with the period of the AC power supply. The lamp 10 thereby is flashed so as to maintain the reference light amount. The AC power supply is connected to a transformer 57 with a power unit 58 from which various voltage are supplied to associated control circuits. AC power from the secondary winding of the transformer 57 is full-wave rectified by diodes 59 and 60, and is supplied to a triangular wave generator 61 to generate a triangular waveform signal A. The triangular waveform signal A is compared with an output signal B from a difference amplifier 63 at a comparator 62. The comparator 62 outputs a high level (H) signal when both the signals are equal to each other, and a low level (L) signal otherwise. These H and L signals from the comparator 62 on/off control the triac 56 through the operation of a trigger unit 68.

In order properly to manage the power control by the triac 56, a transformer 64, a full-wave rectifier 65, and a DC converter 66 are provided. The transformer 64, connected in parallel with the lamp 10, steps down the lamp voltage which is rectified by the full-wave rectifier 65, converted into a DC voltage by the DC converter 66, and applied to one input of the difference amplifier 63.

In the meantime, the lamp voltage data read out from the memory 50 under control of the controller 28 are converted to an analog signal at the D/A converter 53. The analog signal is amplified by an amplifier unit 67, and is applied to the other input of the difference amplifier 63, which outputs a signal B corresponding to a difference between the output voltages from the amplifier unit 67 and the DC converter 66.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A photographic printer comprising:
   a light source for illuminating an exposure station in order to make a photoprint on color paper from a picture frame of photographic film positioned in said exposure station;
   a filter turret rotatably disposed across an optical path between said light source and said exposure station, said filter turret including three color filters, corresponding to three primary colors, and an opening for photometry;
   drive means for rotating said filter turret so as to position one of said photometric opening and said three color filters in said optical path;
   a photometric sensor for measuring light passed through said exposure station from said light source when said photometric opening is positioned in said optical path;
   memory means for storing at least one predetermined stop position such that said drive means stops said turret in a position offset from a position in which an area formed by said photometric opening in said optical path has a maximum size, so as to reduce a light amount of said light source; and
   control means for controlling rotation of said drive means by reading out said stop position from said memory means.

2. A photographic printer as defined in claim 1, wherein said drive means comprises a stepping motor.

3. A photographic printer as defined in claim 2, further comprising detector means for detecting an original position of said filter turret, said detector means including a signal member formed on said turret and a sensor for detecting said signal member.

4. A photographic printer as defined in claim 3, further comprising a masking plate disposed across said optical path in a position close to said filter turret, said masking plate having a circular aperture through which said optical path passes.

5. A photographic printer as defined in claim 4, wherein said three color filters and said photometric opening have a circular shape corresponding to said circular aperture of s id masking plate.

6. A photographic printer as defined in claim 1, wherein said filter turret is positioned in said at least one predetermined stop position when said photometric sensor detects a position taken by said picture frame in order to position said picture frame in said exposure station.

7. A photographic printer as defined in claim 6, wherein said at least one predetermined stop position is obtained beforehand for each type and size of said film.

8. A photographic printer as defined in claim 1, wherein said memory means stores three predetermined stop positions such that said turret is stopped in positions offset from respective positions where areas formed by said respective color filters in said optical path have a maximum size, in order to reduce a light amount of said light source when said respective color filters are positioned in said optical path for photometry in order to calculate an exposure amount for each color.

9. A photographic printer as defined in claim 8, wherein said color filters comprise a red filter, a green filter and a blue filter for effecting three color separation photometry and additive color successive exposure.

10. A photographic printer as defined in claim 1, wherein:
said at least one predetermined stop position is a position for reducing a light amount of said light source when photometry is effected for conditioning said light source, which changes with time;
said memory means stores a predetermined reference light amount of said light source; and
said control means controls said light source at the time of conditioning said light source to make a light amount measured in said photometric sensor coincident with said reference light amount read out of said memory means.

11. A photographic printer as defined in claim 10, wherein a light amount of said light source at the time of conditioning said light source using said at least one predetermined stop position is reduced to a light amount under a condition with a normal control negative film inserted in said optical path for conditioning said light source.

12. A photographic printer as defined in claim 11, wherein:
said memory means further stores voltage data for determining a voltage of said light source; and
said control means corrects said voltage in accordance with a deviation between said measured light amount and said reference light amount when said deviation is detected, and rewrites said corrected voltage data in said memory means.

13. A photographic printer as defined in claim 6, further comprising a power circuit for determining a power of said light source with feedback control so as to keep a predetermined reference light amount written in said memory means.

14. A photographic printer as defined in claim 8, further comprising a power circuit for determining a power of said light source with feedback control so as to keep a predetermined reference light amount written in said memory means.

15. A photographic printer comprising:
a light source for illuminating an exposure station in order to make a photoprint on color paper from a picture frame of photographic film positioned in said exposure station;
a filter turret rotatably disposed across an optical path between said light source and said exposure station, said filter turret including three color filters, corresponding to three primary colors, and an opening for photometry;
drive means for rotating said filter turret so as to position one of said photometric opening and said three color filters in said optical path;
a photometric sensor for measuring light passed through said exposure station from said light source when said photometric opening is positioned in said optical path;
memory means for storing a predetermined reference light amount of said light source and a predetermined stop position such that said drive means stops said filter turret in a position offset from a position where an area formed by said photometric opening in said optical path has a maximum size at the time of conditioning said light source, which changes with time, in order to reduce a light amount of said light source to a light amount under a condition with a normal control negative film inserted in said optical path for conditioning said light source; and
control means for controlling rotation of said drive means by reading out said at least one predetermined stop position from said memory means, and controlling said light source so as to make a light amount measured in said photometric sensor coincident with said reference light amount read out of said memory means.

16. A photographic printer comprising:
a light source for illuminating an exposure station in order to make a photoprint on color paper from a picture frame of photographic film positioned in said exposure station;
a filter turret rotatably disposed across an optical path between said light source and said exposure station, said filter turret including three color filters, corresponding to three primary colors, and an opening for photometry;
drive means for rotating said filter turret so as to position one of said photometric opening and said three color filters in said optical path;
a photometric sensor for measuring light passed through said exposure station from said light source when said photometric opening is positioned in said optical path;
memory means for storing three predetermined stop positions such that said drive means stops said turret in positions offset from respective positions where an area formed by said respective color filters in said optical path has a maximum size, so as to reduce a light amount of said light source when said respective color filters are positioned in said optical path for photometry in order to calculate an exposure amount for each color; and
control means for controlling rotation of said drive means by reading out said stop positions from said memory means.

* * * * *